United States Patent
Conoboy

(10) Patent No.: US 8,064,358 B2
(45) Date of Patent: Nov. 22, 2011

(54) NETWORK AND SYSTEMS MANAGEMENT MONITORING TOOL

(75) Inventor: Brendan L. Conoboy, Albuquerque, NM (US)

(73) Assignee: Red Hat, Inc., Raleigh, NC (US)

( * ) Notice: Subject to any disclaimer, the term of this patent is extended or adjusted under 35 U.S.C. 154(b) by 408 days.

(21) Appl. No.: 11/712,761

(22) Filed: Feb. 28, 2007

(65) Prior Publication Data

US 2008/0205289 A1    Aug. 28, 2008

(51) Int. Cl.
*H04L 12/28* (2006.01)
*G06F 15/177* (2006.01)

(52) U.S. Cl. ........ 370/252; 370/254; 709/220; 709/223; 715/736

(58) Field of Classification Search ................. 370/252, 370/254–256, 351–356; 709/220–224; 715/734–738
See application file for complete search history.

(56) References Cited

U.S. PATENT DOCUMENTS

| | | | |
|---|---|---|---|
| 6,271,845 B1 * | 8/2001 | Richardson | 715/764 |
| 6,375,362 B1 * | 4/2002 | Heiles et al. | 385/75 |
| 7,171,458 B2 * | 1/2007 | Brown et al. | 709/220 |
| 7,219,300 B2 * | 5/2007 | Arquie et al. | 715/736 |
| 7,385,939 B2 * | 6/2008 | Duncan et al. | 370/256 |
| 2003/0086425 A1 * | 5/2003 | Bearden et al. | 370/392 |
| 2005/0265321 A1 * | 12/2005 | Rappaport et al. | 370/352 |
| 2006/0282527 A1 | 12/2006 | Chiou et al. | |
| 2008/0049779 A1 * | 2/2008 | Hopmann et al. | 370/431 |
| 2008/0052394 A1 * | 2/2008 | Bugenhagen et al. | 709/224 |
| 2009/0019141 A1 * | 1/2009 | Bush et al. | 709/223 |

OTHER PUBLICATIONS

"Focus on OpenView: A guide to Hewlett-Packard's Network and Systems Management Platform", Nathan J. Muller, pp. 1-291, CBM Books. 1995.*

* cited by examiner

*Primary Examiner* — Aung S Moe
*Assistant Examiner* — Kerri Rose
(74) *Attorney, Agent, or Firm* — Lowenstein Sandler PC

(57) ABSTRACT

A method and apparatus for managing networks and devices on the networks. The method may include collecting information pertaining to the infrastructure of a network and devices on the network, and presenting a user interface that provides a view of the network and the devices using the collected information. In one embodiment, the user interface allows to make changes to software settings of the devices.

20 Claims, 8 Drawing Sheets

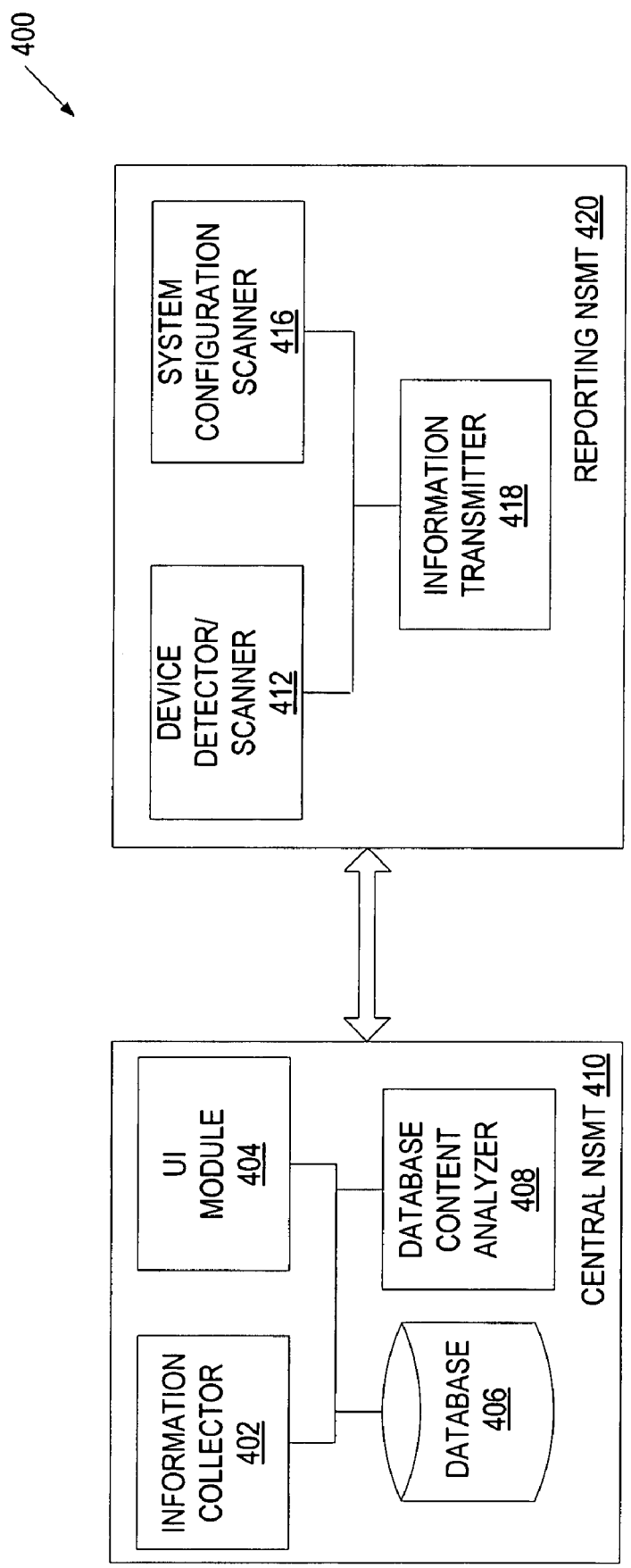

NETWORK AND SYSTEMS MANAGEMENT MONITORING TOOL

TECHNICAL FIELD

Embodiments of the present invention relate to network and systems management, and more specifically to a network and systems management and monitoring tool.

BACKGROUND

Computer networks have become increasingly complex while people have relied on computers coupled to the networks to transmit and fetch information. The computer networks are responsible for transporting information between the computers used in the business as well as allowing users to connect to their work from remote locations. Enterprise management systems have been developed to assist in managing networks and computers on the networks. Current information technology (IT) centers require management that includes network connectivity, server maintenance, and application management for large networks of a few thousand or more devices. As the number of devices increases, it becomes more difficult to detect unexpected changes in the devices on the network.

One disadvantage of existing enterprise management systems is their inability to collect detailed information about the infrastructure of the network and the computers on the network. In addition, existing enterprise management systems do not provide a uniform management interface that can allow an overall view into the network.

BRIEF DESCRIPTION OF THE DRAWINGS

The present invention is illustrated by way of example, and not by way of limitation, and can be more fully understood with reference to the following detailed description when considered in connection with the figures in which:

FIG. 4 is a block diagram of one embodiment of a network and systems management and monitoring tool;

DETAILED DESCRIPTION

Figure 1:
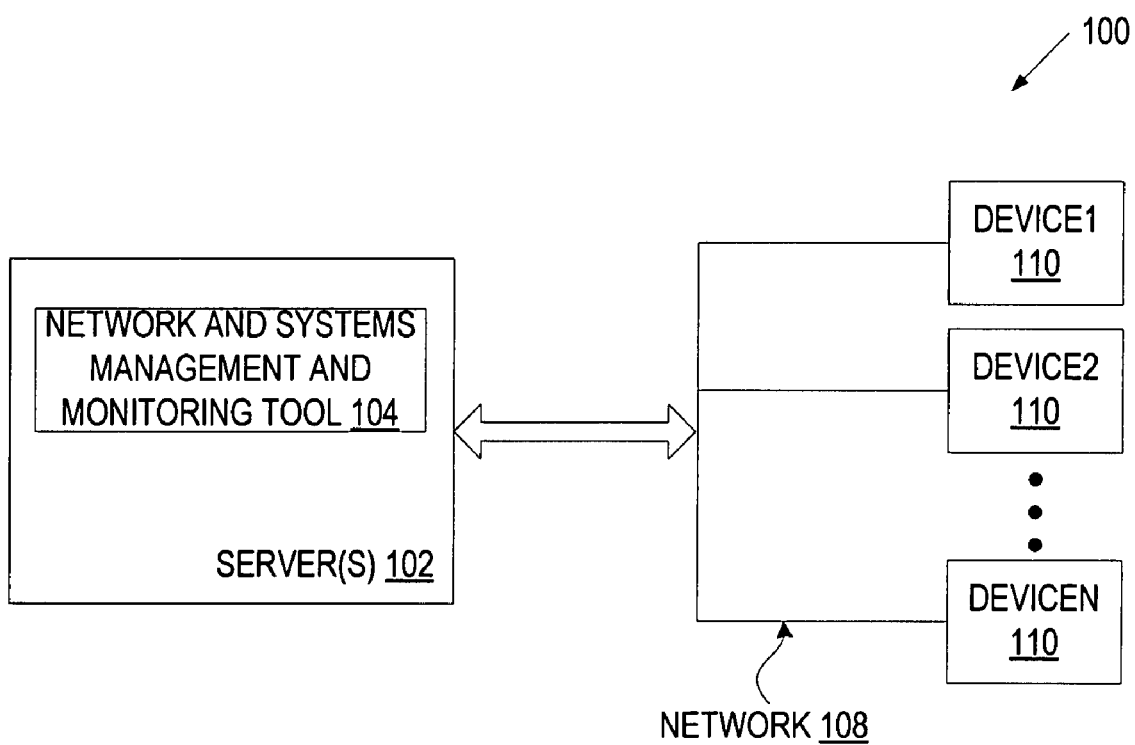
FIG. 1 is a block diagram of one exemplary architecture in which embodiments of the invention may be implemented.

Described herein is a method and apparatus for managing networks and devices on the networks. In one embodiment, a network and systems management tool collects information pertaining to the infrastructure of a network and devices on the network, and stores this information in a database. Upon a user request, the network and systems management tool retrieves current network infrastructure information from the database, and generates a user interface that provides a view of the network and the devices on the network. An exemplary user interface may visually illustrate the network as a map and allow a user to drill down to details about individual devices on the network.

The map-type display of the gathered information allows to use the same interface to display problems with the network. For example, if 1000 machines are displayed in the user interface and some network failure causes 500 of them to be taken off-line, the user interface can visually represent the missing machines by presenting them in a different color, or surrounded in border, thus focusing attention of the viewer on the missing machines. Further, many network failures occur at the router level. Hence, showing the devices as they pertain to the network cabling structure makes it easier for the viewer to visually identify where the problem is likely to be. For instance, if the missing machines are all behind the same network switch, the map-like display allows the system administrator to easily identify a network switch that might have caused the network failure. Without a visual representation, the commonality of which hosts are down might not be so obvious.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate. The network architecture 100 may include one or more servers 102 and a number of devices 10 that comprise a network 108 (e.g., a private network such as a local area network (LAN) or Ethernet). The network 108 may represent a network of an enterprise and may include such devices as desktop computers, laptop computers, network printers, switches, routers, gateways, firewalls, or any other devices having a network address.

The server 102 communicates with the devices 110 via a network, which may be a public network (e.g., Internet) or a private network (e.g., Ethernet or LAN). The server 102 hosts a network and systems management and monitoring tool (NSMMT) 104 that collects information about the network 108 and the devices 110, and presents this information to a user such as an IT administrator. One embodiment of the NSMMT 104 will now be discussed in more detail below in conjunction with FIG. 2.

Figure 2:
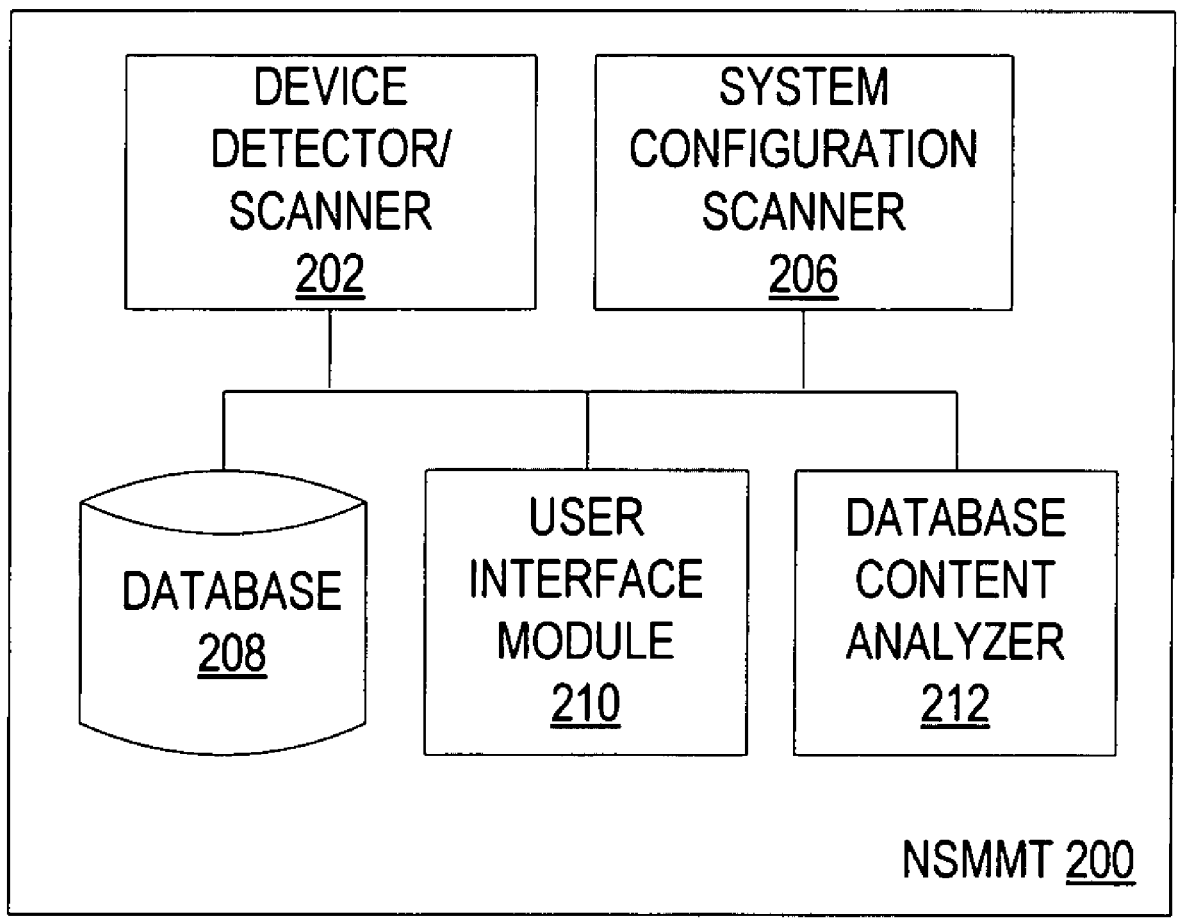
FIG. 2 is a block diagram of one embodiment of a network and systems management and monitoring tool.

Referring to FIG. 2, an NSMMT 200 includes a device characteristics collector 202, a network characteristics collector 206, a database 208, a user interface module 210, and a database content analyzer 212. The device detector/scanner 202 is responsible for detecting devices 110 on the network 108 (e.g., using a device discovery technique), collecting general characteristics of the devices 110 and their network information, and storing collected data in the database 208. It should be noted that although the database 208 is shown as part of the NSMT 200, it may instead be an external component residing on a separate server and accessible by the NSMT 200 via a network.

The general characteristics of devices may include, for example, device hardware characteristics, operating system information, applications running on the devices, configuration parameters of the devices, etc. In one embodiment, the device detector/scanner 202 uses a scanning program (e.g., Nmap) to determine the operating system (e.g., Linux, Windows, Solaris, etc.) of the device, the version of the operating system, and services (application names and version numbers) provided by the device. The device network information may be obtained by existing network monitoring tools (e.g., pchar or nmap) and may include network speed of devices, bandwidth, latency, etc.

The system configuration scanner 206 is responsible for collecting detailed information (e.g., configuration parameters) about devices 110. In one embodiment, the system configuration scanner 206 uses credentials provided by the IT administrator to login to the device and obtain its configuration parameters. The system configuration scanner 206 may collect configuration parameters using existing software tools running on the devices 110, without requiring any new software to be installed on the individual devices 110. Existing tools may include, for example, a secure shell program, a remote desktop protocol or any other tools which reveal additional information about individual devices 110. The configuration parameters may include network connections of the device, printers and faxes connected to the device, applications installed on the device, etc.

The device detector/scanner 202 and the system configuration scanner 206 periodically collect (e.g., at predetermined time intervals) relevant information discussed above and update the contents of the database 208 with the collected information.

The user interface module 210 is responsible for receiving user requests for network and device information, retrieving the current network and device information from the database 208, and generating a user interface that provides the current network and device information in a convenient and easy-to-understand manner. In particular, the user interface visually illustrates the devices 110 on the network 108 and links between the devices 110, and allows a user (e.g., an IT administrator) to view more detailed information about the devices, the links and the network segments. For example, the user interface may present the network 108 as a map, in which a street topology is replaced with a network topology having computers instead of houses and cables instead of streets. The user may then click on a link associated with a specific device, link or network segment to view more detailed information about it. In addition, the map-like display may display the network using characteristics of the road such as how congested network portions are, whether they are unavailable, new or having problems of some type.

The database content analyzer 212 provides additional services for IT administrators using the contents of the database 208. In particular, the database content analyzer 212 may receive a request to configure a newly added device, and respond to this request by automatically configuring the newly added device based on the configuration parameters of the existing devices 110, without requiring any user input. In addition, the database content analyzer 212 may use the data stored in the database 208 to group the devices 110 into clusters based on their configuration (e.g., based on types of services they provide) and add the grouping information to the database 208. The user interface module 210 may then use the grouping information to present clusters of devices 110 rather than individual devices 110 if the number of individual devices is too large, thus simplifying the view of the network infrastructure. Further, the database content analyzer 212 may use the data stored in the database 208 to compare performance characteristics of devices running different operating systems or perform some other analyses.

Figure 3:
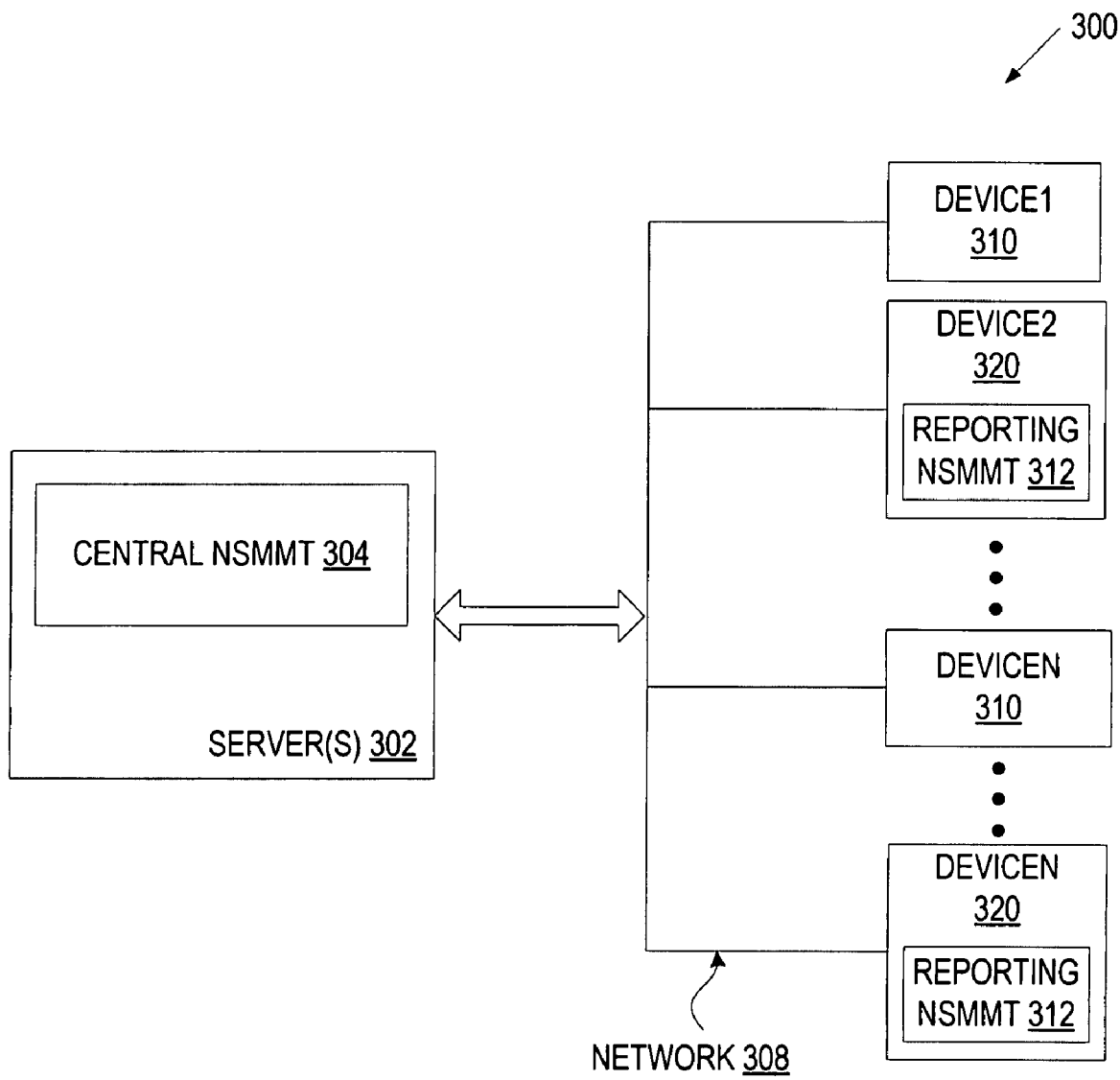
FIG. 3 is a block diagram of another exemplary architecture in which embodiments of the invention may be implemented.

FIG. 3 illustrates another exemplary network architecture 300 in which embodiments of the present invention may operate. The network architecture 300 illustrates a distributed model of the network and systems management and monitoring tool (NSMMT) that includes a central NSMMT 304 residing on the server(s) 302 and reporting NSMMTs 312 residing on individual devices 320 of the network 308 (e.g., a private network such as a local area network (LAN) or Ethernet). The network 308 may represent a network of an enterprise, and devices 310 and 320 and may include, for example, desktop computers, laptop computers, network printers, switches, routers, gateways, firewalls, or any other devices having a network address. The server 302 communicates with the devices 310 and 320 via a network, which may be a public network (e.g., Internet) or a private network (e.g., Ethernet or LAN).

The reporting NSMMTs 312 collect information about the network 308 and the devices 310 and 320 and transmit this information to the central NSMMT 304. The central NSMMT 304 stores the network and device information in a central database and presents it to users such as IT administrators.

It should be noted that although FIG. 3 shows multiple devices 320 hosting the reporting NSMMTs 312, a single device (e.g., a laptop) running the reporting NSMMT 312 can be used to collect network and device information. If needed, this single device can be moved to different segments of the network 308 to collect network and device information at the different network segments. In addition, the central NSMMT 304 may incorporate the functionality of both the reporting NSMT and the central NMST.

FIG. 4 is a block diagram of one embodiment of an NSMMT 400 comprising a central NSMMT 410 and a reporting NSMMT 420. The reporting NSMT 420 includes a device detector/scanner 412, a system configuration scanner 416, and an information transmitter 418. The device detector/scanner 412 is responsible for detecting devices 310 and 320 on the network 308 or a specific segment of the network 308. The specific network segment can be defined by an IT administrator (e.g., by specifying a maximum number of devices to be covered by the reporting NSMT 420, a certain location to be covered by the reporting NSMT 420, or a maximum size of the area to be covered by the reporting NSMT 420). The device detector/scanner 412 may also be responsible for collecting general characteristics and network parameters of devices 310 and 320 on the network 308 or a specific segment of the network 308. The collected general characteristics may include, for example, device hardware characteristics, operating system information, applications running on the devices, configuration parameters of the devices, etc. The network parameters may include, for example, network speed of devices, bandwidth, latency, etc.

The system configuration scanner 416 may be responsible for collecting configuration parameters of devices 310 and 320 on the network 308 or a specific segment of the network 308 (e.g., using the system analyzer that can login to the device and probe the device with its login privileges). The configuration parameters may include network connections of the device, printers and faxes connected to the device, applications installed on the device, etc.

The information transmitter 418 periodically submits the information collected by the device detector 412, the device scanner 414 and the network characteristics collector 416 to the central NSMMT 400. The central NSMMT 400 may include an information collector 402, a user interface module 404, a database 406, and a database analyzer 408.

The information collector 402 receives data from one or more reporting NSMMTs 410 and stores it in the database 406. The user interface module 404 is responsible for receiving user requests for network and device information, retrieving the current network and device information from the database 406, and generating a user interface that provides an overall view into the network infrastructure as was discussed in more detail above in conjunction with FIG. 2.

The database content analyzer 408 provides additional services for IT administrators using the contents of the database 406. For example, the database content analyzer 408 may automatically configure newly added device based on configuration parameters of the existing devices 310 or 320, without requiring any user input. In addition, the database content analyzer 408 may use the data stored in the database 406 to group the devices 310 and 320 into clusters based on their configuration (e.g., based on different services they provide) and add the grouping information to the database 406. Further, the database content analyzer 408 may use the data stored in the database 406 to compare performance characteristics of devices running different operating systems or perform some other analyses.

In one embodiment, the central NSMMT 410 also includes a device detector/scanner and a system configuration scanner to obtain device characteristic, network and configuration information and store it in the database 406, along with data obtained from the reporting NSMMT 420. Then, if the network 308 includes a firewall, the database content analyzer 408 may determine the configuration of the firewall by comparing data obtained on both sides of the firewall (e.g., data obtained by the central NSMMT 410 and data obtained by the reporting NSMMT 420).

Figure 5A:
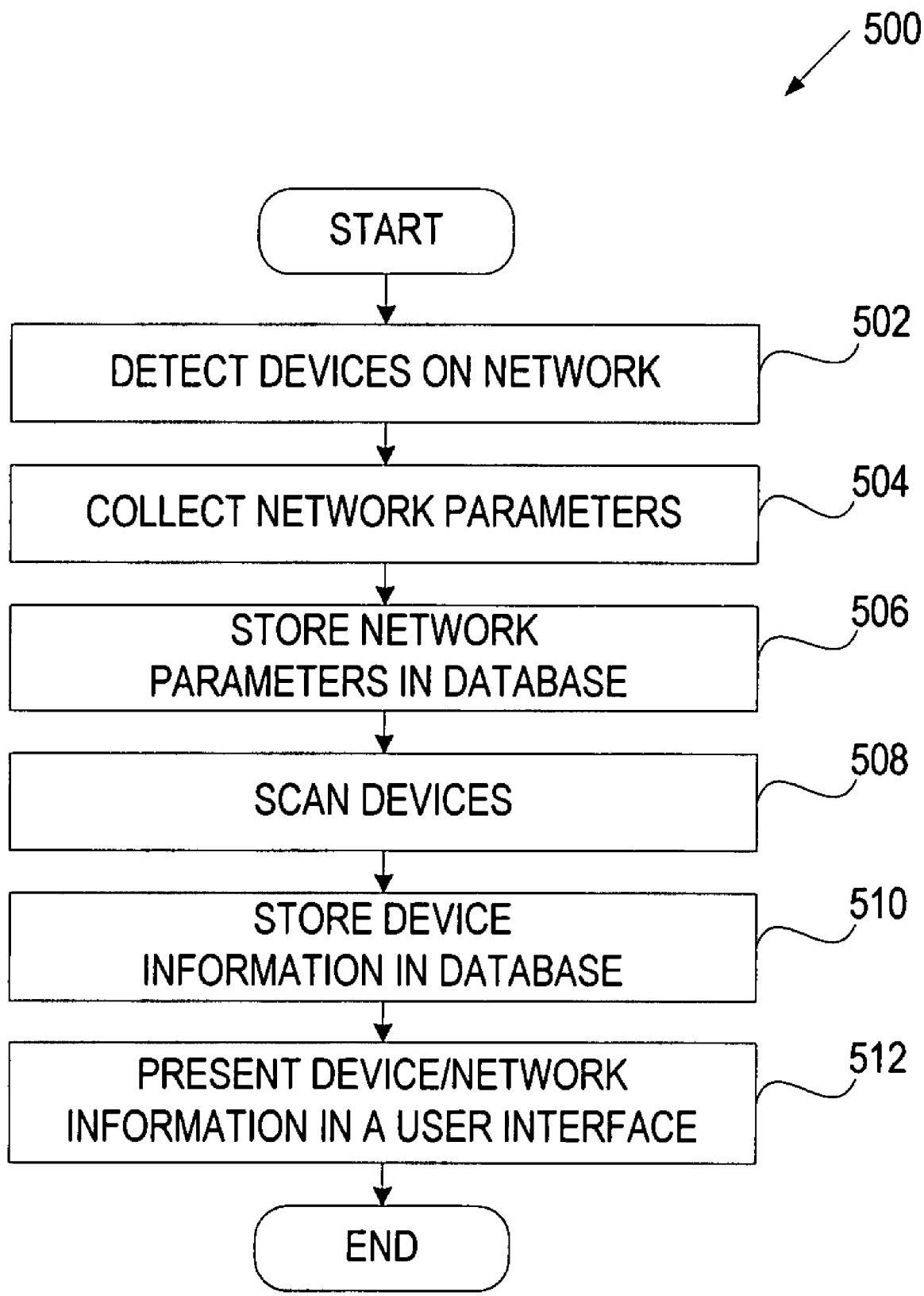
FIG. 5A is a flow diagram of one embodiment of a method for managing a network and monitoring devices on the network.
Figure 5B:
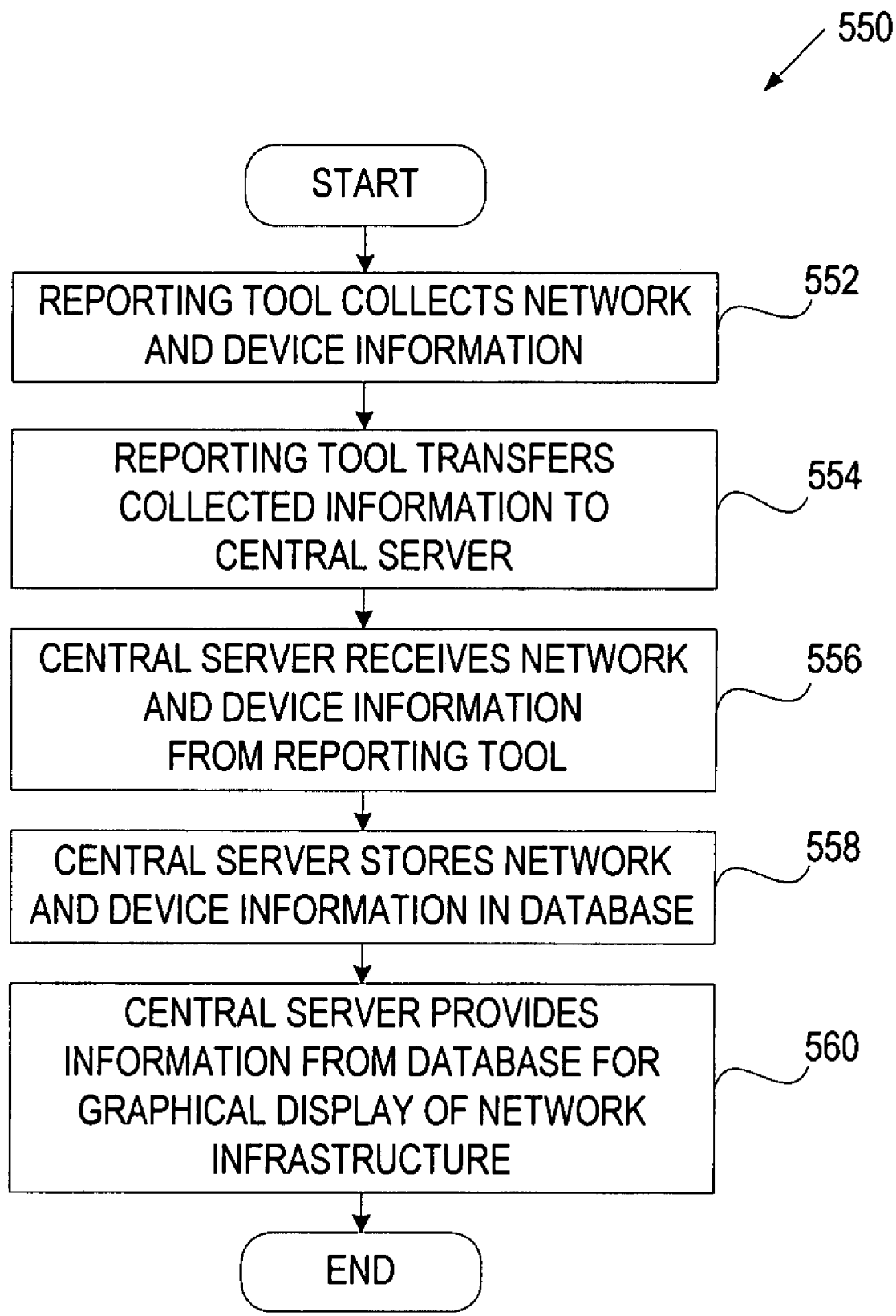
FIG. 5B is a flow diagram of another embodiment of a method for managing a network and monitoring devices on the network.

FIGS. 5A and 5B are flow diagrams of alternative embodiments of a method for managing a network and devices on the network. The method may be performed by processing logic that may comprise hardware (e.g., circuitry, dedicated logic, programmable logic, microcode, etc.), software (e.g., instructions run on a processing device to perform hardware simulation), or a combination thereof.

Referring to FIG. 5A, method 500 is performed by an NSMMT 200 of FIG. 2. Method 500 begins with processing logic detecting devices on a network (block 502), collecting their network information (e.g., network speed of devices, bandwidth, latency, etc.) (block 504), and storing the device network information in a database (block 506).

At block 508, processing logic scans the devices to obtain hardware and software characteristics of the devices and their configuration parameters. Hardware and software characteristics of a device may include, for example, hardware components (e.g., CPU, memory, etc.) of the device, the operating system (e.g., Linux, Windows, Solaris, etc.) of the device, the version of the operating system, and services (application names and version numbers) provided by the device. The configuration parameters of a device may include, for example, network connections of the device, printers and faxes connected to the device, applications installed on the device, etc.

At block 510, processing logic stores the device information obtained at block 508 in the database.

At block 512, processing logic generates a user interface with an overall view of the network infrastructure based on the device and network information stored in the database. In particular, the user interface may visually illustrate the devices on the network and links between the devices, and allow an IT administrator to view more detailed information about the devices, the links and the network segments. For example, the user interface may present the network as a map, in which a street topology is replaced with a network topology having computers instead of houses and cables instead of streets. An IT administrator may click on a link associated with a specific device to access detailed information about this device (e.g., its network address, operating system, hosted applications, etc.). Other graphical representations of the collected information are possible.

Further, in one embodiment, processing logic periodically performs method 500, recollecting the information discussed above and displaying the recollected information. In addition, processing logic automatically determines what has changed since the previous display and illustrates these changes to the user. Processing logic may generate a report specifying the changes and/or it may graphically present the changes in the display (e.g., using a different color, a border, highlighting, or other visual features).

Referring to FIG. 5B, method 550 is performed by an NSMT 400 of FIG. 4. Method 550 begins with processing logic of a reporting NSMT collecting network and device information (block 552) and transferring the collected information to a central server (block 554). As discussed above, the collected information includes hardware and software characteristics of devices on the network, their configuration parameters, and network characteristics. Hardware and software characteristics of a device may include, for example, hardware components (e.g., CPU, memory, etc.) of the device, the operating system (e.g., Linux, Windows, Solaris, etc.) of the device, the version of the operating system, and services (application names and version numbers) provided by the device. The configuration parameters of a device may include, for example, network connections of the device, printers and faxes connected to the device, applications installed on the device, etc. The network characteristics may include, for example, bandwidth, latency, loss of link, response time, etc.

Next, processing logic of the central server receives the network and device information from the reporting NSMT (block 556) and stores this information in a database (block 558). At block 560, processing logic of the central server provides the device and network information from the database for a graphical display of an overall view of the network infrastructure, as was discussed in more detail above.

Figure 6A:
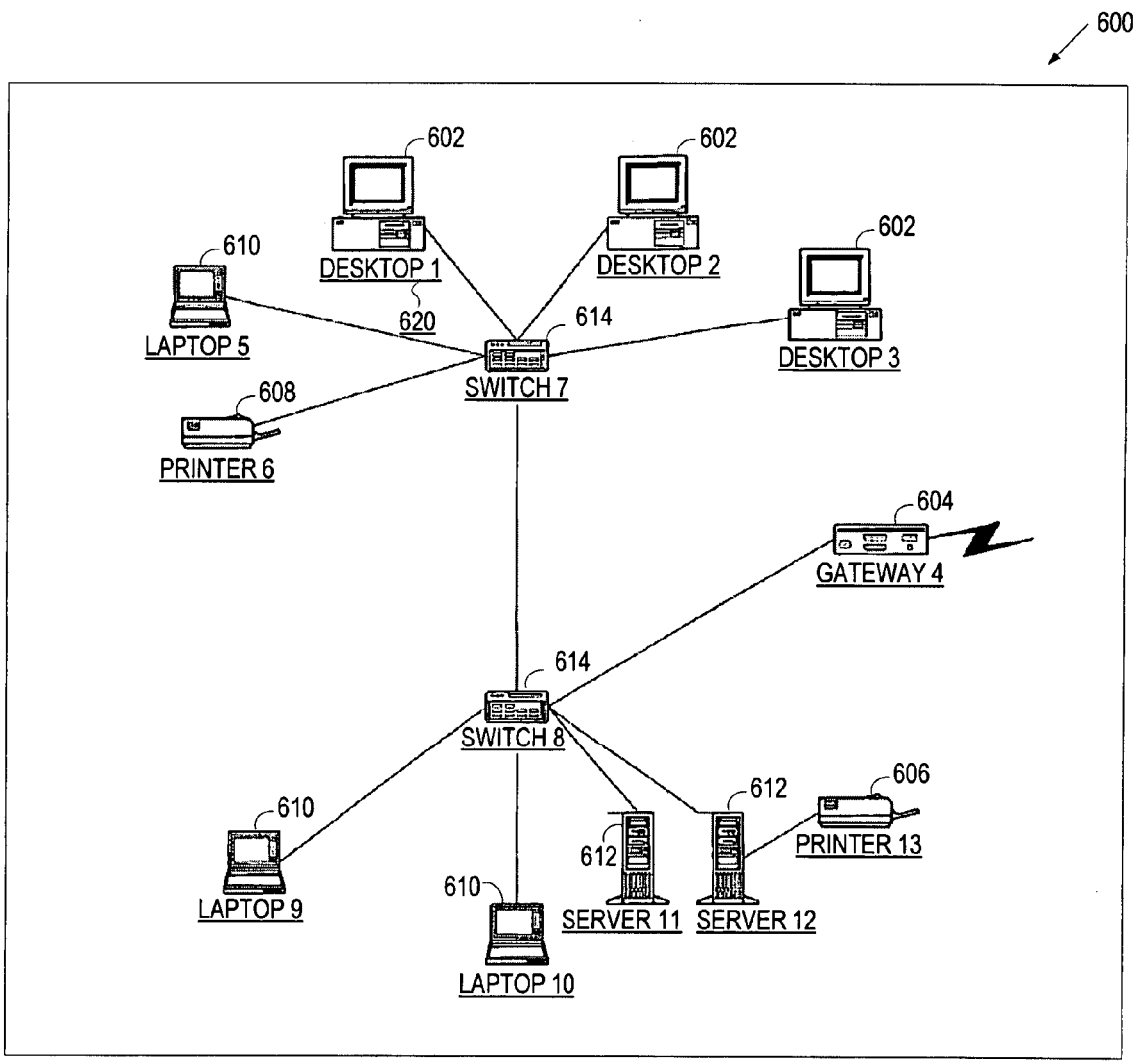
FIGS. 6A and 6B are exemplary user interface provided by a network and systems management and monitoring tool according to one embodiment of the invention.
Figure 6B:
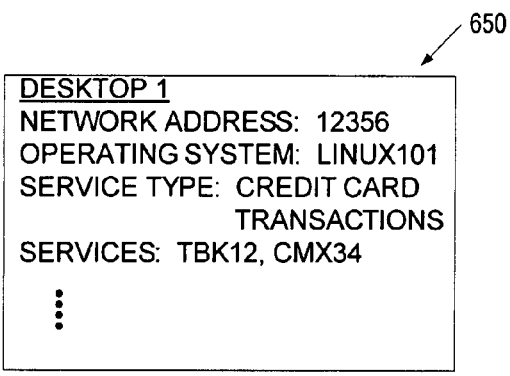

FIGS. 6A and 6B illustrate exemplary user interfaces that may be provided by the NSMT 200 or 400 in accordance with one embodiment of the invention. User interface 600 visually illustrates devices on a network and connections between the devices. The devices include desktop computers 602, laptop computers 610, a network printer 608, a laser printer 606, switches 614, servers 612, and a gateway 604. The lines between the devices illustrate how the devices are connected with each other. If a certain connection is broken, it may be illustrated by a broken line. Each device has a link that can be activated to view more detailed information about the device. For example, if a link 620 of a desktop computer 602 is activated, a popup window (or a separate window) 650 of FIG. 6B may appear to provide detailed information for the desktop computer 602.

In addition, the user interface 600 may allow a user to click on a line connecting two devices to view detailed information about the connection (e.g., connection type, speed, etc.). Further, the user interface 600 may display (not shown) current network characteristics (e.g., bandwidth, latency, firewalling, etc.) on the initial screen 600 (e.g., on top or at the bottom of the screen) or when the user activates a designated control. The user interface 600 may also allow a user to click on a certain segment of the network to view characteristics of the specified network segment. Once a change is detected in the current network conditions, this change is dynamically reflected in the network view provided by the user interface.

In one embodiment, the user interface 600 allows a user to select a device and provide different software settings for the selected device. The NSMMT then automatically updates current software settings of the selected device based on the provided changes.

Figure 7:
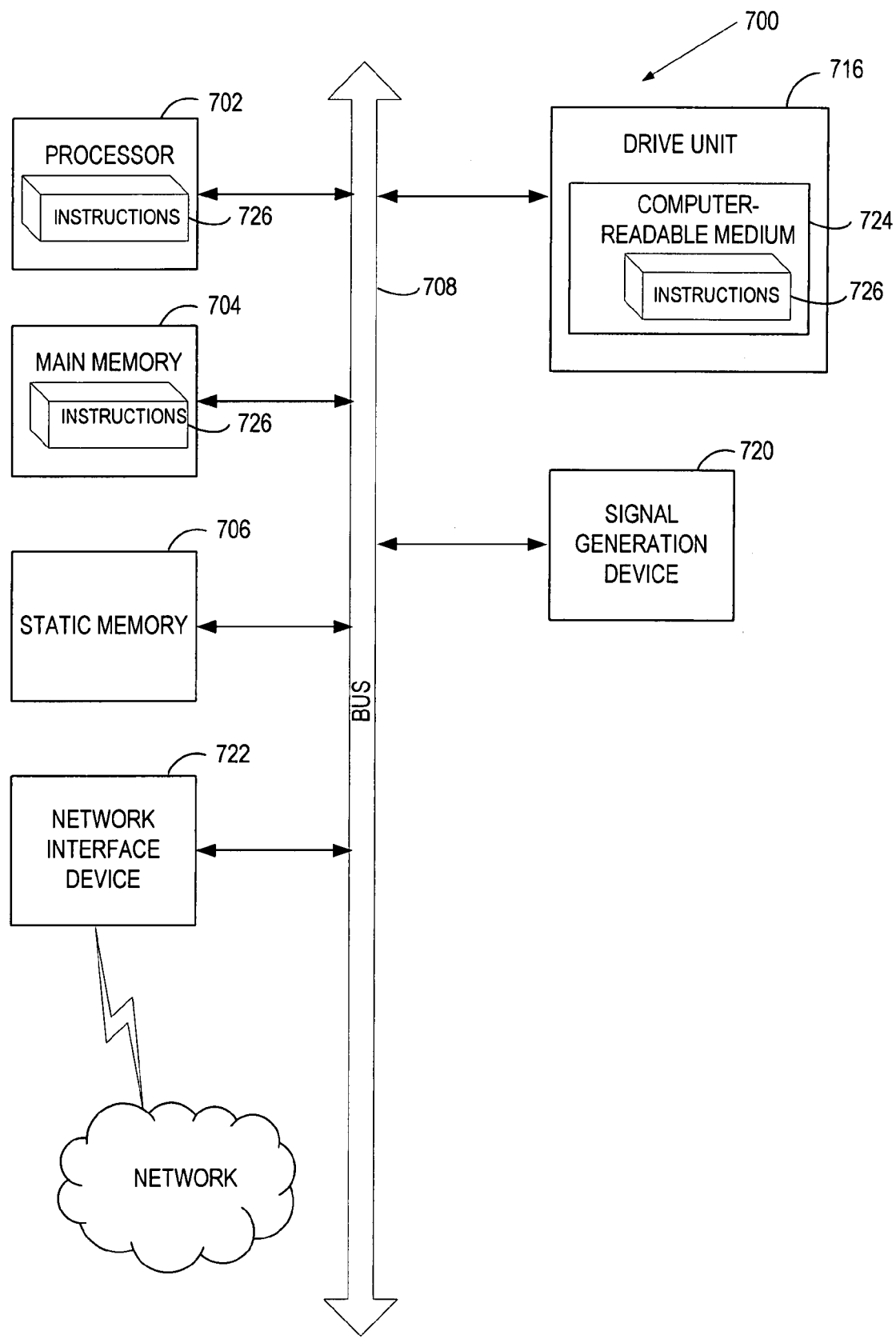
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a server 102 or any device 110.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), and a static memory 706 (e.g., flash memory, static random access memory (SRAM), etc.), which may communicate with each other via a bus 730. Alternatively, the processing device 702 may be connected to memory 704 and/or 706 directly or via some other connectivity means.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 702 is configured to execute processing logic 726 for performing the operations and steps discussed herein.

The computer system 700 may further include a network interface device 722 and/or a signal generation device 720. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 700 may or may not include a data storage device 716 having a machine-accessible storage medium 724 on which is stored one or more sets of instructions (e.g., software 726) embodying any one or more of the methodologies or functions described herein. The software 726 may also reside, completely or at least partially, within the main memory 704 and/or within the processing device 702 during execution thereof by the computer system 700, the main memory 704 and the processing device 702 also constituting machine-accessible storage media. The software 726 may further be transmitted or received over a network 720 via the network interface device 722.

While the machine-accessible storage medium 724 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
    collecting, by a server computer system, information pertaining to an infrastructure of a network and a plurality of devices on the network;

presenting, by the server computer system, a user interface that provides a view of the network and the plurality of devices using the collected information, the view provided by the user interface including links between graphical representations of devices to illustrate how the plurality of devices are connected and including a broken link to graphically illustrate when a connection between any of the plurality of devices is broken, the user interface further allowing a user to select at least one of the plurality of devices presented in the user interface, and to view one or more characteristics of the at least one selected device, and the user interface additionally allowing the user to select a link between two devices and to view detailed information about a corresponding connection between the two devices;

receiving via the user interface, by the server computer system, at least one new software setting provided by the user for the at least one selected device; and automatically updating, by the server computer system, current software settings of the at least one selected device based on the at least one new software setting provided by the user for the at least one selected device.

2. The method of claim 1 wherein each of the plurality of devices has a network address.

3. The method of claim 1 wherein collecting the information pertaining to the infrastructure of the network and the plurality of devices on the network comprises:
detecting the plurality of devices; and
determining characteristics of each of the plurality of devices.

4. The method of claim 3 wherein the characteristics of each of the plurality of devices comprise one or more of hardware characteristics, operating system information, applications running on said each of the plurality of devices, or configuration parameters of said each of the plurality of devices.

5. The method of claim 4 further comprising:
adding new devices to the network; and
configuring the new devices based on the configuration parameters of existing devices.

6. The method of claim 1 wherein collecting the information pertaining to the infrastructure of the network and the plurality of devices on the network comprises:
collecting current characteristics of the network.

7. The method of claim 6 wherein the current characteristics of the network comprise one or more of bandwidth, latency or loss of link between any of the plurality of devices.

8. The method of claim 1 further comprising:
recollecting information pertaining to an infrastructure of a network and a plurality of devices on the network;
determining changes in the recollected information since a previous presentation in the user interface; and
reflecting the changes when presenting the recollected information in the user interface.

9. The method of claim 1 wherein the user interface presents the view of the network by visually illustrating the plurality of devices on the network and links associated with the plurality of devices, each of the links allowing the user to select a corresponding device presented in the user interface.

10. The method of claim 9 further comprising:
grouping the plurality of devices into clusters based on configuration parameters of the plurality of devices; and
visually representing the clusters on the user interface.

11. The method of claim 1 wherein collecting the information pertaining to the infrastructure of the network and the plurality of devices on the network comprises:

determining a firewall configuration by collecting information on both sides of a firewall.

12. A non-transitory machine-accessible storage medium including data that, when accessed by a machine, cause the machine to perform a method comprising:
collecting information pertaining to an infrastructure of a network and a plurality of devices on the network;
presenting a user interface that provides a view of the network and the plurality of devices using the collected information, the view provided by the user interface including links between graphical representations of devices to illustrate how the plurality of devices are connected and including a broken link to graphically illustrate when a connection between any of the plurality of devices is broken, the user interface further allowing a user to select at least one of the plurality of devices presented in the user interface, and to view one or more characteristics of the at least one selected device, and the user interface additionally allowing the user to select a link between two devices and to view detailed information about a corresponding connection between the two devices;
receiving via the user interface, by the server computer system, at least one new software setting provided by the user for the at least one selected device; and
automatically updating, by the server computer system, current software settings of the at least one selected device based on the at least one new software setting provided by the user for the at least one selected device.

13. The non-transitory machine-accessible storage medium of claim 12 wherein collecting the information pertaining to the infrastructure of the network and the plurality of devices on the network comprises:
detecting the plurality of devices;
determining characteristics of each of the plurality of devices, wherein the characteristics of each of the plurality of devices comprise one or more of hardware characteristics, operating system information, applications running on said each of the plurality of devices, or configuration parameters of said each of the plurality of devices; and
collecting current characteristics of the network, wherein the current characteristics of the network comprise one or more of bandwidth, latency or loss of link between any of the plurality of devices.

14. The non-transitory machine-accessible storage medium of claim 13 wherein the method further comprises:
adding new devices to the network; and
configuring the new devices based on the configuration parameters of existing devices.

15. The non-transitory machine-accessible storage medium of claim 12 wherein the user interface presents the view of the network by visually illustrating the plurality of devices on the network and links associated with the plurality of devices, each of the links allowing the user to select a corresponding device presented in the user interface.

16. An apparatus comprising:
a database to store information pertaining to an infrastructure of a network and a plurality of devices on the network; and
a user interface module operatively coupled with the database to present a user interface that provides a view of the network and the plurality of devices using the collected information, the view provided by the user interface including links between graphical representations of devices to illustrate how the plurality of devices are connected and including a broken link to graphically illustrate when a connection between any of the plurality of devices is broken, the user interface further allowing a user to select at least one of the plurality of devices presented in the user interface, to view one or more characteristics of the at least one selected device, to receive via the user interface at least one new software setting provided by the user for the at least one selected device, and to automatically update current software settings of the at least one selected device based on the at least one new software setting provided by the user for the at least one selected device, and the user interface additionally allowing the user to select a link between two devices and to view detailed information about a corresponding connection between the two devices.

17. The apparatus of claim 16 further comprising:
a device to detect the plurality of devices and to determine characteristics and network parameters of each of the plurality of devices; and
a system configuration scanner to collect configuration parameters of each of the plurality of devices.

18. The apparatus of claim 17 wherein:
the characteristics of each of the plurality of devices comprise one or more of hardware characteristics, operating system information, or applications running on said each of the plurality of devices; and
the configuration parameters of each of the plurality of devices comprise one or more of bandwidth, latency or network speed of any of the plurality of devices.

19. The apparatus of claim 18 further comprising:
a database content analyzer operatively coupled with the database to configure new devices added to the network based on the configuration parameters of existing devices.

20. The apparatus of claim 16 wherein the user interface presents the view of the network by visually illustrating the plurality of devices on the network and links associated with the plurality of devices, each of the links allowing the user to select a corresponding device presented in the user interface.

* * * * *